(12) United States Patent
Guyot et al.

(10) Patent No.: US 6,467,417 B1
(45) Date of Patent: Oct. 22, 2002

(54) VEHICLE TABLE

(75) Inventors: Josh Guyot, Fly Creek, NY (US); Mark A. Ehrhardt, Pittsburgh, PA (US); Daniel Darnell, Boulder, CO (US); Scott Froom, N. Miami Beach, FL (US); Emily Gustavsen, Turnersville, NJ (US); Richard Bohman, Endicott, NY (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/809,232

(22) Filed: Mar. 15, 2001

Related U.S. Application Data
(60) Provisional application No. 60/211,850, filed on Jun. 15, 2000.

(51) Int. Cl.[7] .............................................. A47B 23/00
(52) U.S. Cl. ........................ 108/44; 100/152; 224/519
(58) Field of Search ........................... 108/44, 45, 152, 108/47, 90; 224/521, 519, 518

(56) References Cited

U.S. PATENT DOCUMENTS

| | | | |
|---|---|---|---|
| 1,348,220 A | * | 8/1920 | Hathaway ................... 108/47 |
| 4,005,898 A | | 2/1977 | Way |
| 4,910,816 A | | 3/1990 | Lansing |
| 5,215,234 A | * | 6/1993 | Pasley |
| 5,228,581 A | * | 7/1993 | Palladino et al. |
| 5,364,120 A | | 11/1994 | Shimansky |
| 5,575,521 A | | 11/1996 | Speis |
| 5,984,613 A | * | 11/1999 | Motilewa ................ 224/519 X |
| 6,113,171 A | * | 9/2000 | Stearns |
| 6,173,660 B1 | * | 1/2001 | Emmert |
| 6,237,824 B1 | * | 5/2001 | Bagley ........................ 224/521 |
| 6,314,891 B1 | * | 11/2001 | Larson ........................ 108/44 |
| 6,336,413 B1 | * | 1/2002 | Ball ............................ 108/44 |

FOREIGN PATENT DOCUMENTS

DE 2450060 * 4/1976

* cited by examiner

Primary Examiner—Jose V. Chen
(74) Attorney, Agent, or Firm—Gigette Bejin

(57) ABSTRACT

A foldable table for a vehicle provides a durable work surface suited for construction work and the like. The table includes a planar member, a mounting structure, a bracket and a support member. The mounting structure is provided to vertically position the planar surface at the side of the vehicle. The bracket secures the mounting structure to the side of the vehicle and the support member retains the planar surface. The support member is pivotally attached to the mounting structure whereby the support member and the planar surface may be stowed by pivoting the planar surface and the support member toward the vehicle.

13 Claims, 3 Drawing Sheets

VEHICLE TABLE

This claims benefit of provisional application Ser. No. 60/211,850 filed Jun. 15, 2000.

FIELD OF THE INVENTION

The present invention generally relates to the field of vehicle accessories, and in particular, a foldable table for a vehicle.

BACKGROUND OF THE INVENTION

Vehicle manufacturers and aftermarket vehicle outfitters seek to improve customer satisfaction by providing components which are tailored to particular customer needs. For example, utility vehicles such as pickup trucks are widely used by construction or repair personnel. Pickup trucks are preferred by construction or repair personnel because pickup trucks are capable of travelling over rough terrain and are also capable of carrying and storing equipment used by construction or repair personnel.

Vehicle components have been implemented in trucks to increase customer satisfaction. Existing vehicle components include attachable toolboxes, tailgate ramps and caps. However, the attachable toolboxes and caps only meet the need of storing equipment and supplies. Moreover, the tailgate ramp only meets the need of the personnel to remove the equipment and supplies from the vehicle. The vehicle and its components do not provide construction or repair personnel adequate workspace with which to use the equipment and supplies.

Generally, construction or repair personnel must open the tailgate of the pickup truck to a horizontal position to create a workspace. However, there are several issues with using the tailgate as a table. First, the horizontal tailgate surface generally does not provide an adequately sized workspace area. Second, when the tailgate is used as a work table, the equipment used by the operator at the tailgate blocks access to equipment stored in the bed of the truck. Third, the tailgate may be permanently damaged when used as a work surface.

U.S. Pat. No. 5,575,521 issued to Speis discloses a fold-up combination tailgate table, sink and storage box for the rear of a pickup truck. The table in the '521 patent folds out from the tailgate. However, the table of the prior art does not overcome the problems identified above. For example, the prior art table does not provide adequate workspace. Furthermore, the table of the '521 patent does not overcome the problem of personnel having barrier free access to additional supplies in the vehicle while the table is in use.

Consequently, a need has developed for a side-mounted vehicle table which may be easily stored and provides ample workspace.

SUMMARY OF THE INVENTION

Accordingly, it is a principle object of the present invention to provide a vehicle table which may be easily stored and provides ample workspace.

It is another object of the present invention to provide a table which provides a user access to all storage areas of the vehicle when the table is in use.

It is still another object of the present invention to provide a durable table which may be mounted to the side of a vehicle.

In accordance with the above objects and other objects and features of the present invention, a foldable table for a vehicle is provided. The table includes a planar member, a first mounting means, a first bracket, a first positioning means, and a first support member. The mounting means has a first end and is provided to vertically position the planar surface at the side of the vehicle. The first bracket includes a receptacle which receives the mounting means at the first end of the mounting means and secures the mounting means to the side of the vehicle. The support member retains the planar surface and is pivotally attached to the mounting means whereby the support member and the planar surface may be stowed by pivoting the planar surface and the support means toward the vehicle.

As those skilled in the art will recognize, the embodiments of this invention may vary depending upon the specific requirements of a vehicle. Accordingly, the particular size and shape of the planar member, mounting means, bracket, positioning means and support members may vary, depending on the particular application.

The above objects and other objects, features, and advantages of the present invention are more readily understood from a review of the attached drawings and accompanying specification and claims.

DETAILED DESCRIPTION OF THE PREFERRED EMBODIMENT

The present invention provides for a foldable table mounted on the side of a vehicle. The table provides ample workspace when in an open position and may be folded when the table is not in use.

Figure 1:
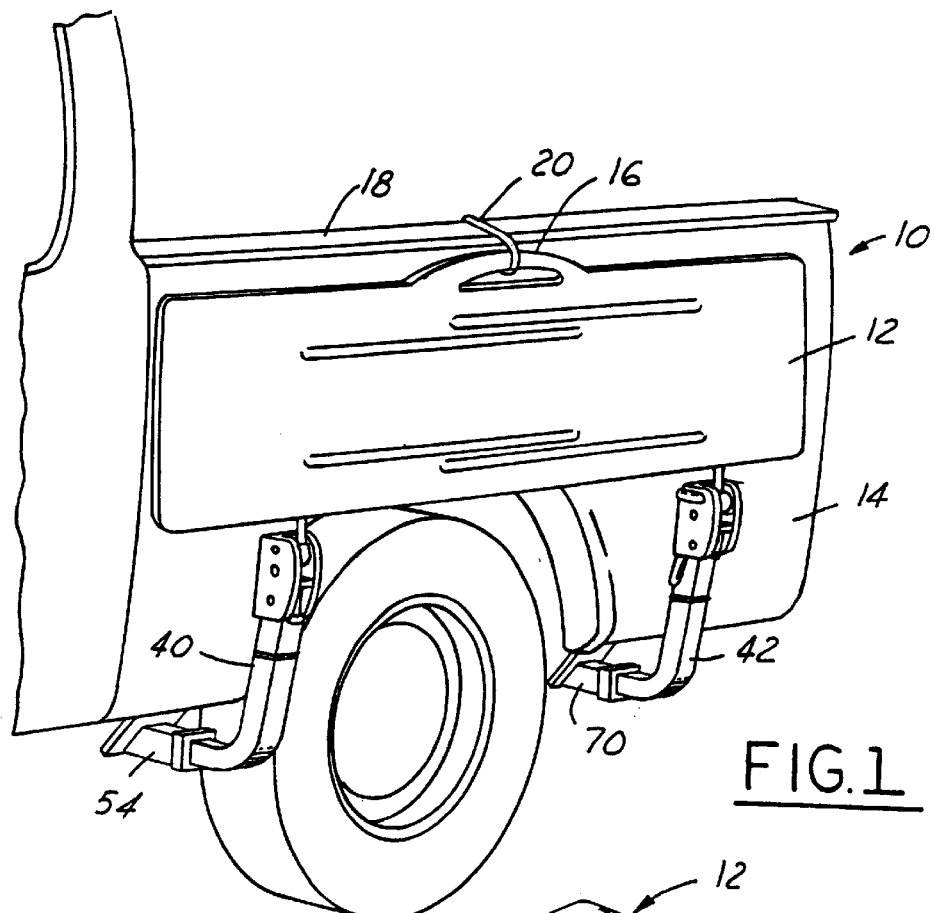
FIG. 1 is a perspective view of the present invention as installed on the side of a pickup truck in a stowed position.

With reference to FIG. 1, the present invention 10 is shown in perspective view installed on the side of a pickup truck 14 in a stowed position. It is preferable to have a side-mounted table 10 to enable access to equipment through the rear of the vehicle 14.

As shown, the foldable table 10 may be stowed by pivoting the planar member 12 and support members (shown in FIGS. 2, 4a and 4b) upward and toward the vehicle 14. The planar member 12 may but not necessarily include a handle 16 either attached to or formed in the lateral edge 18 of the planar member 12. The handle 16 is provided to assist the user in opening and closing the table 10. The planar member 12 may be secured against the vehicle 14 in its stowed position with a strap 20 which surrounds the handle 16 and is secured to the vehicle 14.

Figure 2:
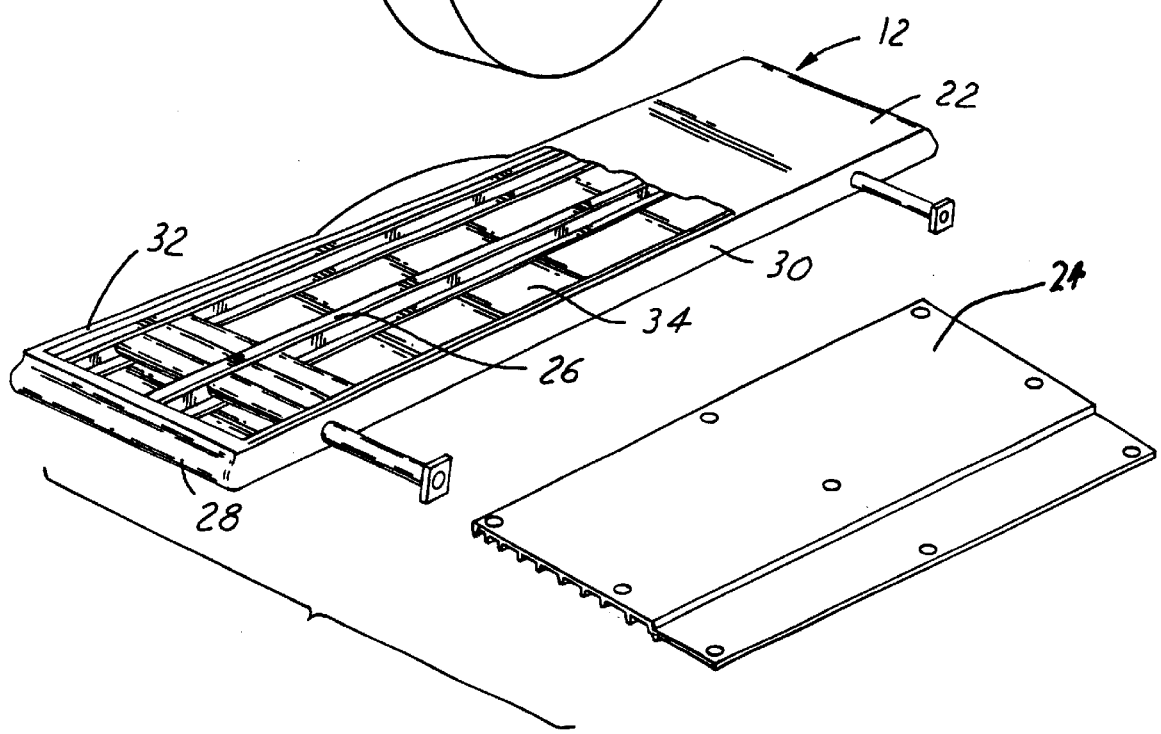
FIG. 2 is a perspective view of the present invention as installed on the side of a pickup truck in an open position.

Referring now to FIG. 2, the planar member 12 may take a variety of shapes such as rectangular, oval or square. The planar member 12 is preferably but not necessarily made of a plastic shell 22, a plastic panel 24, and an Aluminum frame 26 disposed within the plastic shell 22. Aluminum is a preferred material for the frame 26 due to its lightweight characteristics. The Aluminum frame 26 preferably has an I-beam construction. With respect to the shell 22, plastic is a preferable material for the shell 22 because plastic is a durable and lightweight material. Furthermore, a plastic surface 24 reduces damage to equipment used on the table 10 in instances where the equipment cuts into the table 10.

The shell 22 of the planar member 12 is formed of first 28, second 30, third 32 and fourth (not shown) vertical walls and a bottom horizontal wall 34. The Aluminum frame 26 is housed within the shell 22 and is covered at the top by at least one plastic panel 24 which also serves as a work surface. The plastic panel 24 may be fastened to the shell 22 with fasteners such as screws. The plastic panel 24 may be removed and replaced when damaged.

Figure 3:
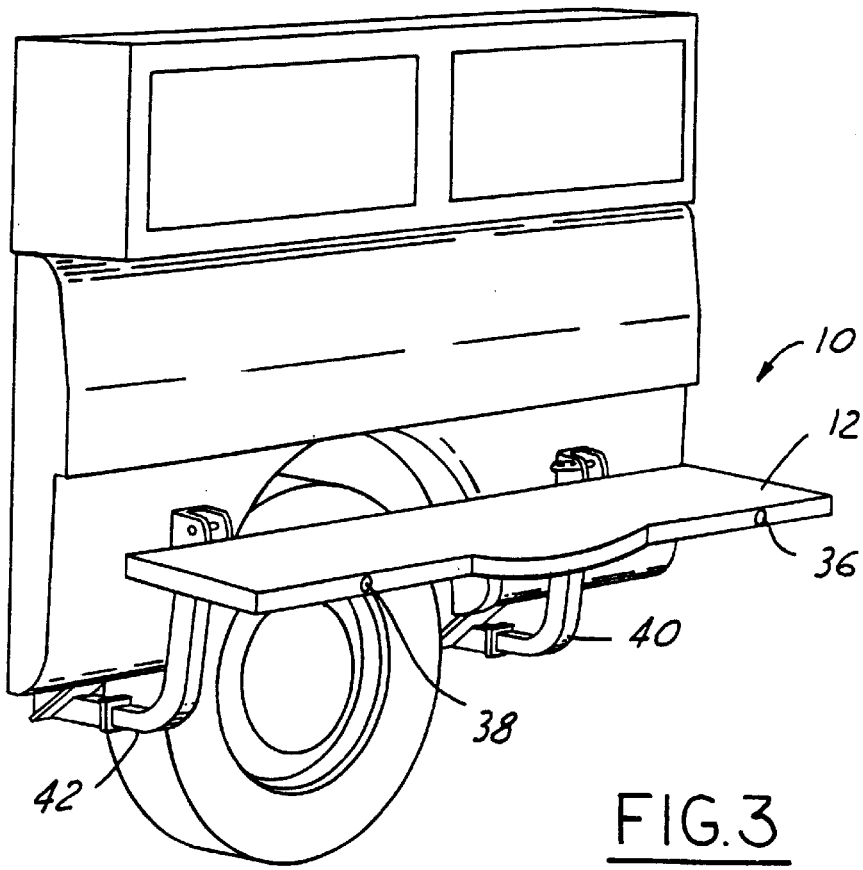
FIG. 3 is an isometric view of the planar member with the plastic panel removed.

Referring now to FIG. 3, the vehicle table 10 may be pivoted to an open position. The planar member 12 is retained in position by a first support member 36, and where the table length requires, a second support member 38 as shown in FIGS. 2 and 3. The first and second support members 36, 38 are pivotally attached to the first and second mounting means 40, 42 and hold the planar member 12 in position. The first and second support members 36, 38 may further include abutments 25, 27 shown in FIG. 2) located at the lateral ends of each support member 36, 38.

Figure 4A:
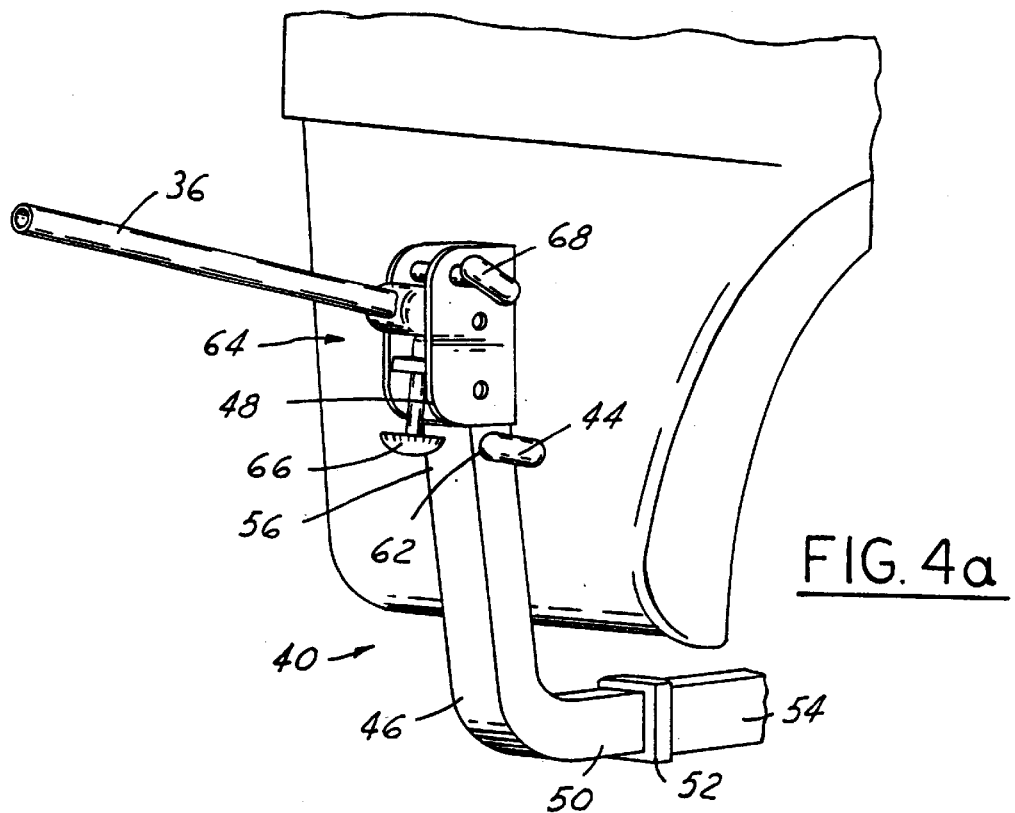
FIGS. 4a and 4b are enlarged perspective views of a preferred embodiment of the mounting means, positioning means and the support members of the present invention.
Figure 4B:
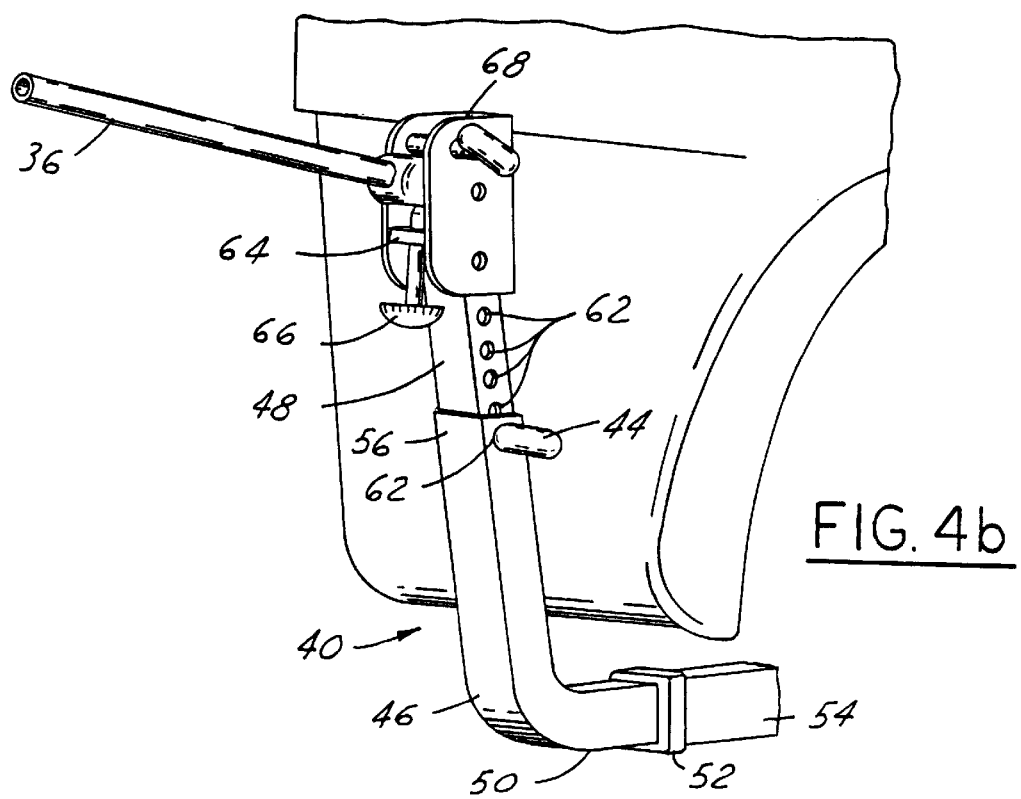

Referring now to FIGS. 4a and 4b, the first mounting means is illustrated in an enlarged isometric view with the first support member 36 attached. The second mounting means 42 is identical to the first mounting means 40 and therefore, is not shown in the drawings. As shown in FIGS. 4a and 4b, the first mounting means 40 includes an adjustment pin 44, a first tubular member 46 and a second tubular member 48. A first end 50 of the first tubular member 46 is mounted to the vehicle 14 at the receptacle 52 of the bracket 54 and the second tubular member 48 is nested within the second end 56 of the first tubular member 46. The first tubular member 46 includes an aperture 58 for receiving a pin 44 for adjusting the position of the second tubular member 48. The second tubular member 48 further includes a plurality of apertures 62 along the length of the second tubular member 48. The adjustment pin 44 is positioned within the first tubular member aperture and received within one of the plurality of apertures 62 of the second tubular member 48 to adjust the vertical position of the second tubular member 48.

Also referring to FIGS. 4a and 4b, a first positioning means 70 is disposed at the joint of the first support member 36 and the first mounting means 40. The positioning means shown in FIG. 4 is a screw 66 in cooperation with a joining bracket 68. As shown, the joining bracket 68 is affixed to the second tubular member 48 and the support member 36 is pivotally mounted to the second tubular member 48 and the joining bracket 68. The screw 66 is mounted within the joining bracket 68 and may be turned to vary the angle of the support member 36 and the planar member 12 when the planar member 12 is in an open position.

Referring now to FIGS. 1, 4a, 4b and 5, the mounting means 40 is affixed to a vehicle 14 at a first mounting bracket 54. The first mounting means 40 is affixed to the vehicle 14 with a first mounting bracket 54. Where a second mounting means 42 is implemented, a second mounting bracket 70 affixes the second mounting means 42 to the vehicle 14.

Figure 5:
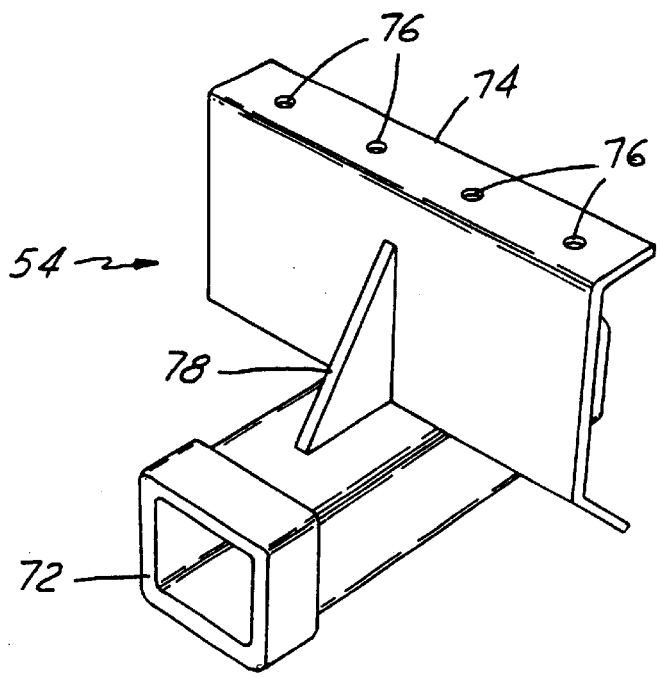
FIG. 5 is an enlarged perspective view of a preferred embodiment of the first bracket.

FIG. 5 is an enlarged isometric view of a preferred embodiment for the first mounting bracket 54. As shown the first mounting bracket 54 includes two parts. The first part is a receptacle 72 for the first mounting means 40. The receptacle 72 is preferably, but not necessarily, an approximately 8-inch section of 2-inch square stock. The second part of the mounting bracket 54 is a bent steel plate 74 which may partially surround a section of the vehicle frame. The steel plate 74 is bolted to the vehicle frame. The bent steel plate 74 and the receptacle 72 may be welded together. The joint may be further reinforced with a gusset 78 as shown in FIG. 5.

While the best mode for carrying out the invention has been described in detail, those familiar with the art to which this invention relates will recognize various alternative designs and embodiments for practicing the invention as defined by the following claims. The words used in the specification are words of description rather than limitation, and it is understood that various changes may be made without departing from the spirit and the scope of the invention.

What is claimed is:

1. A foldable work table for a vehicle, the work table comprising:

a planar member, the planar member having a shell, a first surface and a second surface, the first surface being removeably affixed to the shell;

a first mounting means having a first end and a second end, the first mounting means being operative to vertically adjust the height of the planar surface relative to a side of a vehicle;

a first bracket mounted on the frame of a vehicle, the bracket having a receptacle for receiving the first end of the mounting means and securing the mounting means to the side of the vehicle;

a first support member for retaining the planar member, the first support member being pivotally attached to the second end of the mounting means; and a first positioning means disposed between the first support member and the first mounting means, the first positioning means being operative to vary the angle of the planar member and the first support member relative to the first mounting means.

2. The foldable table defined in claim 1, wherein the first mounting means is comprised of a first tubular member and a second tubular member nested in the first tubular member, the first tubular member defining an aperture and the second tubular member defining a plurality of apertures for receiving an adjustment pin whereby the second tubular member may be vertically adjusted with respect to the first tubular member.

3. The foldable work table defined in claim 1, further comprising:

a second mounting means having a first end and a second end, the second mounting means being operative to vertically position the planar surface relative to a side of a vehicle;

a second bracket mounted on the frame of a vehicle, the bracket having a receptacle for receiving the first end of the mounting means and securing the mounting means to the side of the vehicle;

a second support member for retaining the planar member, the second support member being pivotally attached to the second end of the second mounting means; and a second positioning means disposed between the second support member and the second mounting means, the second positioning means being operative to vary the angle of the planar member and the second support member relative to the second mounting means.

4. The foldable work table defined in claim 1 wherein the first support member includes an abutment at a lateral end of the first support member to maintain the position of the planar member on the first support member.

5. The foldable table defined in claim 1 further comprising a strap mounted to the bed of the pickup truck for fastening the planar member against the side of the truck when the table is in a stowed position.

6. The foldable table defined in claim 3, wherein the first and second mounting means is each comprised of a first tubular member and a second tubular member nested in the first tubular member, the first tubular member defining an aperture and the second tubular member defining a plurality of apertures for receiving an adjustment pin whereby the second tubular member may be vertically adjusted with respect to the first tubular member.

7. The foldable work table defined in claim 3 wherein the first and second support members each include a first abutment at a first lateral end of the first support member and a second abutment at a second lateral end of the second support member to secure the position of the planar member.

8. A foldable work table for a vehicle, the work table comprising:
    a planar member having a shell, a first surface and a second surface, the first surface being removeably affixed to the shell;
    a first mounting means and a second mounting means for vertically adjusting the height of the planar member relative to a side of a truck bed;
    a first bracket for securing the first mounting means to the side of the vehicle;
    a second bracket for securing the second mounting means to the side of the vehicle; and
    a first support member and a second support member for retaining the planar surface, the first support member being pivotally attached to the first mounting means and the second support member being pivotally attached to the second mounting means,
whereby the first and second support members and the planar surface may be stowed by pivoting the planar surface and the first and second support members toward the vehicle.

9. The foldable table defined in claim 8, wherein the first and second mounting means is each comprised of a first tubular member and a second tubular member nested in the first tubular member, the second tubular member being vertically adjustable with respect to the first tubular member.

10. The foldable work table defined in claim 8 wherein the first and second support members each include a first abutment at a first lateral end of the first support member and a second abutment at a second lateral end of the second support member to secure the position of the planar member.

11. A foldable work table for a vehicle, the work table comprising:
    a planar member, the planar member having a shell, a first surface and a second surface, the first surface being removeably affixed to the shell;
    a first mounting means having a first end and a second end, the first mounting means being operative to vertically adjust the height of the planar surface relative to a side of a vehicle;
    a first bracket mounted on the frame of a vehicle, the bracket having a receptacle for receiving the first end of the mounting means and securing the mounting means to the side of the vehicle;
    a first support member for retaining the planar member, the first support member being pivotally attached to the second end of the mounting means;
    a first positioning means disposed between the first support member and the first mounting means, the first positioning means being operative to vary the angle of the planar member and the first support member relative to the first mounting means a first joining bracket being affixed to the first mounting means and the first support member is pivotally mounted to the first joining bracket; and
    a first screw mounted on the first joining bracket and the first screw being rotatable within the first joining bracket to move the screw shaft against the first support member to vary the angle of the first support member relative to the first mounting means.

12. A foldable table for a vehicle, the table comprising:
    a planar member, the planar member having a first surface and a second surface, at least one of the first and second surfaces being replaceable;
    a first mounting means having a first end and a second end, the first mounting means being operative to vertically position the planar surface relative to a side of a vehicle;
    a first bracket mounted on the frame of a vehicle, the bracket having a receptacle for receiving the first end of the mounting means and securing the mounting means to the side of the vehicle;
    a first support member for retaining the planar member, the first support member being pivotally attached to the second end of the mounting means; and
    a first positioning means disposed between the first support member and the first mounting means, the first positioning means being operative to adjust the position of the planar member and the first support member relative to the first mounting means.

13. A foldable table for a vehicle, the table comprising:
    a planar member, the planar member having a shell, a first surface and a second surface, the first surface being removeably affixed to the shell;
    a first mounting means having a first end and a second end, the first mounting means being operative to vertically position the planar surface relative to a side of a vehicle;
    a first bracket mounted on the frame of a vehicle, the bracket having a receptacle for receiving the first end of the mounting means and securing the mounting means to the side of the vehicle;
    a first support member for retaining the planar member, the first support member being pivotally attached to the second end of the mounting means; and
    a first positioning means disposed between the first support member and the first mounting means, the first positioning means being operative to adjust the position of the planar member and the first support member relative to the first mounting means.

* * * * *